April 13, 1948.　　　F. MILLER　　　2,439,520
DRIVING MECHANISM
Filed Jan. 8, 1945　　　2 Sheets-Sheet 1
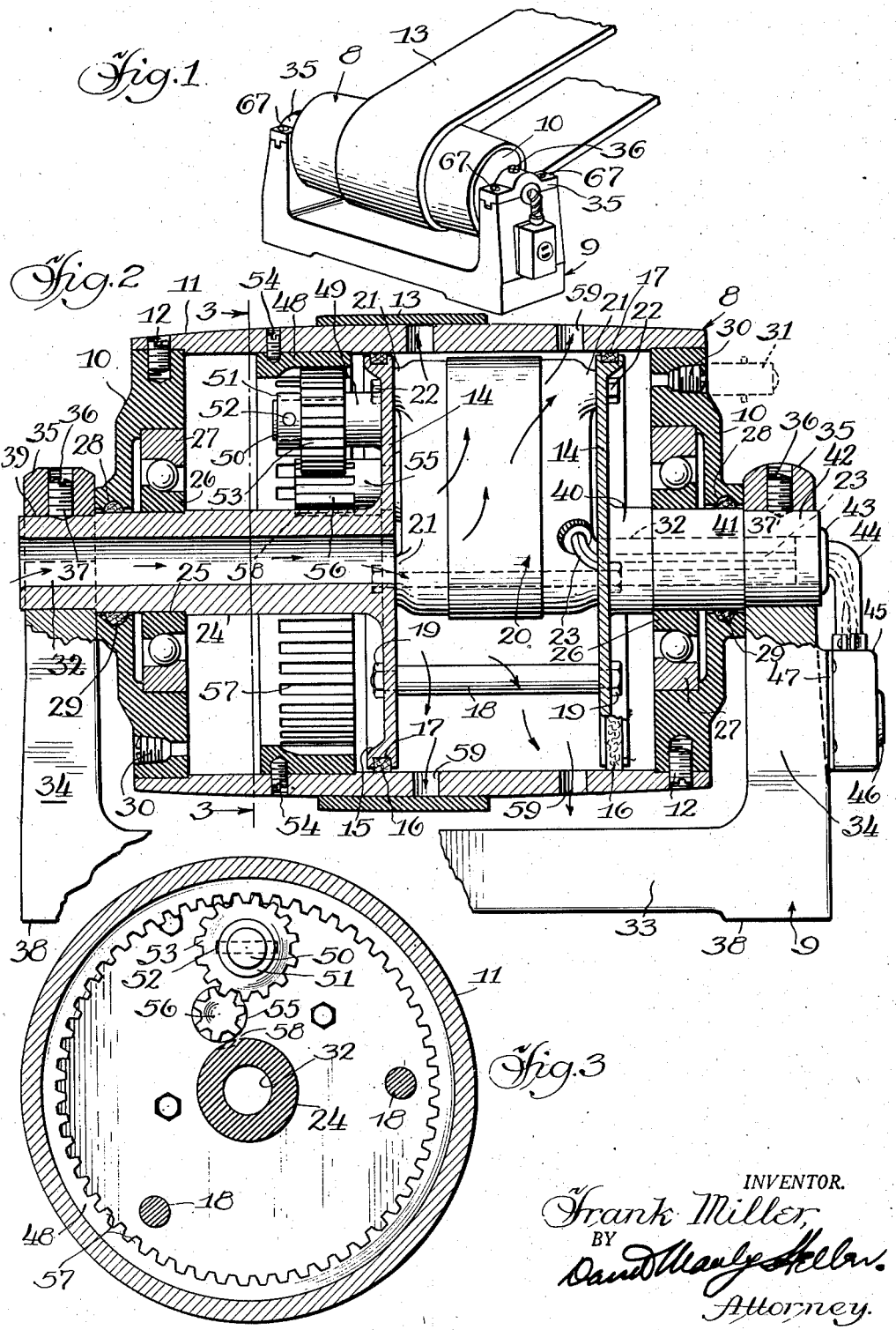

April 13, 1948.  F. MILLER  2,439,520
DRIVING MECHANISM
Filed Jan. 8, 1945  2 Sheets-Sheet 2

INVENTOR.
Frank Miller
BY
Attorney.

Patented Apr. 13, 1948

2,439,520

UNITED STATES PATENT OFFICE 2,439,520

DRIVING MECHANISM

Frank Miller, Chicago, Ill.

Application January 8, 1945, Serial No. 571,911

1 Claim. (Cl. 74—421)

My invention as depicted on the accompanying drawings has reference to a compact driving unit or mechanism to be used in connection with transmission systems in order to provide the essential motive power therefor.

An important object of my invention is to provide a driving unit containing drum means in which is enclosed the complete motive power mechanism providing a compact mechanism that may be conveniently moved about and interchangeably used in connection with various power transmission systems, and which is provided with structure to accommodate a quantity of lubricant to be packed thereinto.

Another object of my invention is to provide a compact mechanism of the aforementioned character which is especially adaptable for belt drive.

A further object of my invention is to provide a stator, and a rotor in combination therewith, the rotor having enclosed therein the complete power driving mechanism.

A further object of my invention is to provide a compact mechanism of the aforementioned character which is especially adaptable for gear drive, or transmission.

A still further object of my invention is to provide a compact mechanism of the aforementioned character which is especially adaptable for chain and sprocket drive or transmission.

A still further object of my invention is to provide a compact mechanism of the aforementioned character which is simple in construction, practical and efficient in its application, use, and operation, and of such elemental structure as to warrant economical production thereof in quantities.

Other features, and ancillary objects, and advantages to be derived from the application and use of my invention will become readily apparent from an examination of the accompanying drawings, having particular reference to the ensuing description, wherein like symbols are used to designate like parts, and in which:

Fig. 1 is a perspective view of one form of my invention.

Fig. 2 is a longitudinal cross-sectional view thereof.

Fig. 3 is a transversal cross-sectional view taken, substantially, on the line 3—3 of Figure 2.

Figure 4:
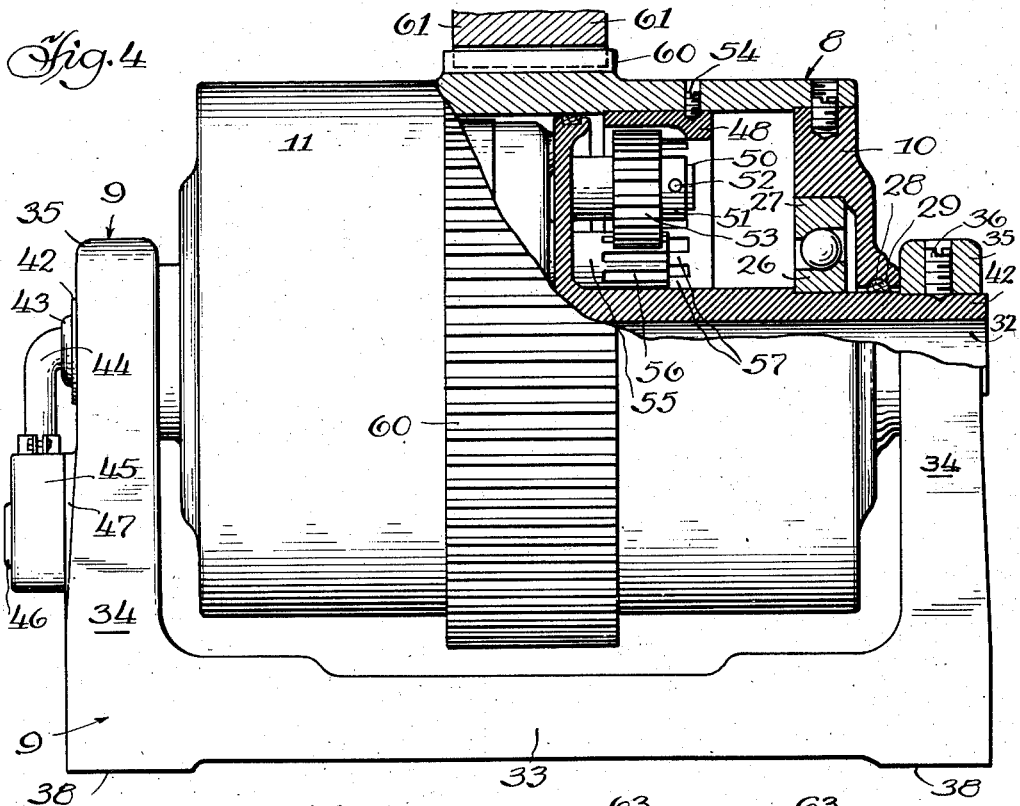
Fig. 4 is a front view of my invention showing a slight modification thereof.

Referring, more particularly, to Figures 1, 2, and 3, my invention is comprised of a support, generally, designated 9 which provides suitable bearings, or stator support for the rotor unit, generally, designated 8.

In this particular form, it is to be noted that the rotor 8 is in the form of a drum simulating a crown-shaped pulley, or a pulley with a crowned periphery, on which operates a belt 13 in order to transmit the power from the rotor 8 to some driven means not indicated.

The support, generally, designated 9 is comprised of a base substantially, of U formation having a bottom portion 33 suitably relieved to form feet 38, and two uprights 34 to which are secured the bearing caps 35 by means of screws 67, forming a suitable composite arrangement composed of the bearing caps 35 and the uprights 34 embracing a suitable cylindrical recess in order to support the stator extensions 42 and 39, the same being securely and fixedly held in place by means of set screws 36, and being imbedded in the extensions 42 and 39 by the conical indentations 37 formed on the said extensions to prevent rotation of the said extensions.

The rotor structure 8 is, generally, comprised of a set of end flanges 10 secured to the cylindrical crown-shaped drum 11 by virtue of set screws 12. The flanges 10 are, suitably, recessed in order to receive the ball-bearing structures consisting of the inner races 26 and the outer races 27 confining therebetween in conventional manner, or form, the ball-bearings proper. The said flanges 10 are also provided with extensions which are provided with recesses 28 semi-circular in cross-section in order to receive the packing or seal means 29.

Within the drum 11, I insert two flange-like structures 14, right and left respectively, the right flange being provided with a stub shaft or extension, having an enlarged portion 40 and a reduced portion 41, and also a further reduced portion 42 providing suitable shoulders to facilitate assembly with respect to the flange structure 10 and the upright portion 34 of the base, generally, designated 9. The left hand flange 14 is provided with an extension having an enlarged portion 24, an intermediately reduced portion 25, and a terminal reduced end portion 39. The said shaft extensions on the said flanges 14 are both hollow and provided with bores 32 for reasons which will be, hereinafter, more clearly elucidated. The flanges 14 are also provided with enlarged peripheral sections 15, which are suitably recessed as indicated at 17 in order to receive the seal packing 16; thus providing suitable sealed chambers between the flanges 14 and the outer-most portions of the flanges 10, hence permitting the said chambers to be packed with grease so that the units or mechanism may be constantly and permanently lubricated without any of the lubricant escaping therefrom, providing a mechanism which is not only compact in form, but which requires little or no attention whatsoever over long periods of time.

Intermediately between the said flanges 14, the motive power means 20 is connected, in this particular instance it has been, preferable, to employ electro-motive power means, which is provided with a series of feet or bosses 21 on each end thereof, so that the same may be secured to the flanges 14 by means of screws 22. The said motive power means 20 is provided with an electrical outlet from which emanate the connecting wires 23; the said wires being passed thru the recess 32 within the shaft extension 40 and ultimately thru the bore within a bushing 43 and suitable metal protection in the form of tubing 44, which is connected to the outlet box 45, provided with a receptacle 46, which may be in turn connected to a suitable source of electrical current supply. The electrical outlet box 45 may be conveniently mounted on suitably machined surfaces, or pads 47 provided on the uprights 34 of the base or support, generally, designated 9.

To the left flange 14, I secure a bearing stud 49 which retains rotatably the shaft 50 to which I secure the intermediate gear 53 held rotatably by a collar 51, secured to the rotating shaft 50 by means of a pin 52. The intermediate gear 53 is driven by the pinion 56, formed on the extension 55, protruding thru the flange 14, and being integral with the armature of the motor 20, furnishing the initial driving means thru the intermediate gear 53 causing the annular gear 48 to be rotated; the said gear 48, having teeth 57, and being firmly secured to the drum 11 by virtue of screws 54, will cause the said drum to rotate in frictional or tractional contact with the belt 13, and the crowned surface of the drum 11 will cause the belt 13 to be driven centrally of the drum, thus in turn driving any machine, unit, or device, that is to be driven, and which may be connected to the other end of the belting or transmission 13. The extension 42 may require relief at 58 to clear the pinion 55.

In Figure 4, I show a slightly modified form of my invention, wherein the rotor drive 11 is not necessarily of crown configuration inasmuch as integrally formed therewith, I provide an enlarged ring gear portion 60 in which are cut a series of gear teeth so as to mesh with the gear teeth of any unit to be driven, such as is suggestively illustrated at 61; thus the driving mechanism comprising the motive power element, or unit, for a transmission system which instead of using a belt drive, in this form shown in Figure 4, may be applicable to a gear drive type of transmission. It may be found desirable in some instances to modify the structure of Figure 4 to simulate the structure of Figure 5 in which event a duplex or more balanced system for driving may be utilized, wherein two gear elements 62 form part of the driving mechanism and are in meshing engagement, or relationship, with two driven units designated 63.

Figure 7:
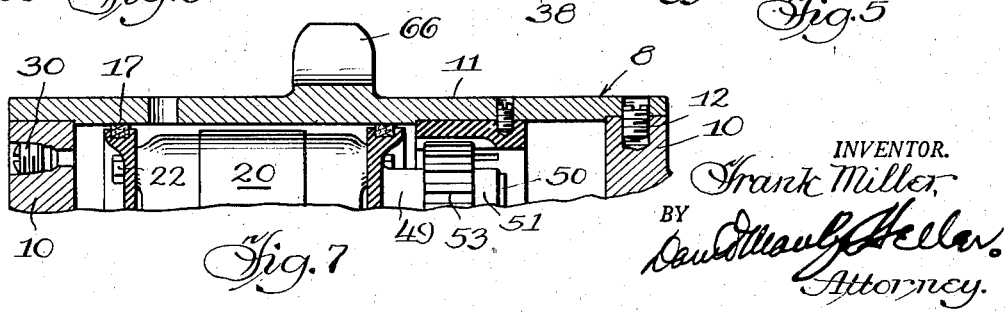
Fig. 7 is a fragmentary longitudinal cross-sectional view embracing still another slightly modified form of my invention as applied to the various forms of power transmission systems.

In Figure 7, I indicate a slightly modified form of my invention to render the same adaptable for sprocket and chain drive, or chain type of transmission, in which event the outer drum 11 is not crowned, but is provided with an enlarged centrally positioned cylindrical portion in which are cut a series of sprocket teeth 66 to engage with a suitable chain which is enmeshed therewith in order to provide motivation to some driven unit at a remote point with respect to the driving unit, generally, designated 8.

Figures 5, 6:
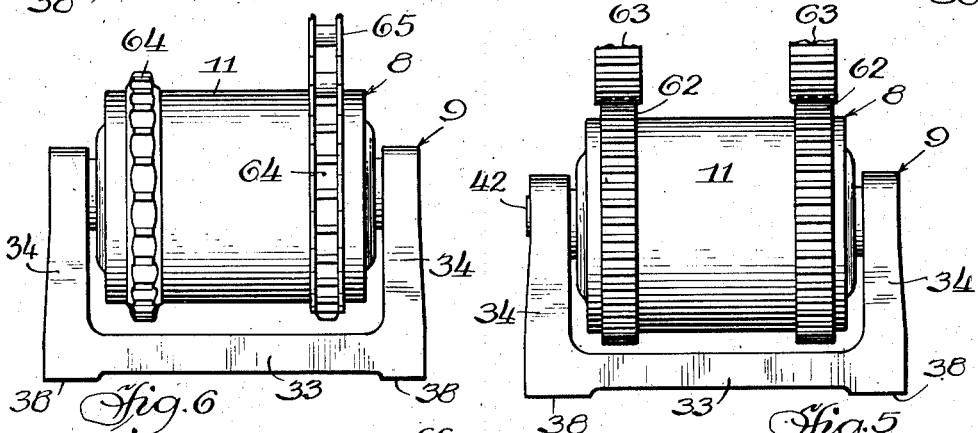
Fig. 5 is a front view showing another slightly modified form thereof.
Fig. 6 is a view similar to Figure 5 showing another slightly modified form of my invention.

In Figure 6, I show a slightly modified form of the sprocket and chain transmission means wherein the drum 8 is provided with a sprocket 64 on each end thereof, and each sprocket being in mesh with a chain transmission 65.

The operation of the unit is self evident, inasmuch as, when the outlet 46 is connected to a suitable source of electrical supply, the current flowing thru the motor unit 20 causes the armature thereof to rotate, in turn rotating the pinion shaft 55, the teeth 56 thereof transmitting motion to the intermediate idler gear 53, in turn rotating the annular gear 48, which being secured to the drum 11, causes the said drum 11 to be rotated thus furnishing traction transmission to the belt 13, or the driven gears 61 or 63, or the transmission chain 65.

The flanges 10 are provided with pipe tapped openings which are sealed by screw seated pipe plugs 30, which may be removably positioned therein, in order to furnish a suitable connection for an adapter fitting designated 31 to engage removably a pressure lubricating gun so that the confines between the right flange 10 as well as the confines between the left flange 14 and the left flange 10 of Figure 2 may be packed with grease which is retained within these confines by virtue of seal packings 16 and 29 respectively.

Thus, it can be seen that, I have provided a compact driving type of unit having all its elemental structure concealed within the periphery of the driving element, a unit which is mobile if of larger size, and portable if made of smaller size, and which is readily adaptable to transmission systems eliminating the alignment and positioning of various units usually comprising such a mechanism, the entire mechanism being self contained and in compact form.

It further goes without saying from the previous elucidation and description, that the unit may also be packed with lubricant which is maintained under seals so that the device requires very little attention. The arrows indicated in Figure 2 illustrate and the vent openings 59 are provided for the purpose of allowing the air currents to circulate between the flanges 14, where the motor is situated, and permit air currents to enter within this compartment circulating therethru in order to provide suitable cooling effects to the motor unit 20. The said flanges 14, in addition to being held together by the motor unit 20, may further be maintained in perfect alignment by the stud bolts 18 which have reduced threaded portions at each of their ends in order to receive the lock-nuts 19 thus forming a rigid and compact unit for the entire structure. The unit is also constructed so that accessibility to the motor, and for repair to any of the elements may be readily and easily made by removing the caps 35, and any one of the flanges 10.

The unit comprising my invention may be manufactured to provide different speed rotors by furnishing different internal gearing ratio combinations. It is also to be noted that the shafts and their support comprise the stator of my unit, whereas the balance of the mechanism that of the rotor, the combined stator and rotor providing an ideal compact construction.

I believe, I have, herein, described and explained, rather succinctly, the nature of the construction, and the operation and utility of my invention, and inasmuch as the same is susceptible of many alterations, modifications, and improvements, I, hereby, reserve the right to any and all such modifications and improvements coming within the scope and spirit of my invention, also those impliedly suggested by the accompanying drawings, as well as those that may be derived from the purview of the foregoing description.

Having thus described and revealed my invention, what I claim as novel and desire to secure by Letters Patent is:

A compact driving unit comprising, a stator including, a base having two upright support arms, flanged elements provided with hollow stub shaft extensions rigidly secured to the said upright support arms, seal means secured to the peripheries of the flanges of the said flanged elements, motive power means confined between the said flanges and being secured thereto and provided with electrical connection means confined in one of the said hollow stub shaft extensions the terminus thereof secured to a source of electrical supply, a driving pinion co-extensive with the motor shaft passing thru a recess in the flange of one of said flanged elements, and an intermediate gear rotatably secured to the flange of one of said flanged elements and positioned in meshing relationship with the said driving pinion, the said driving pinion being eccentrically positioned with respect to the axis of said hollow stub shaft extensions; and a rotor including, a drum, drum flanges secured to each end of said drum, the said drum flanges provided with bearing means rotatably secured to the said hollow stub shaft extensions, and further provided with seal means fitted over the said hollow stub shaft extensions, the said drum being rendered rotatably operative about the flanges of the said flanged elements, the said first-mentioned seal means in conjunction with the said second-mentioned seal means defining outer compartments adapted to retain a volume of lubricant, means on the said drum flanges providing access to the said outer compartments permitting lubricant under pressure to be packed and retained therein, the said flanged elements positioned so as to define an intermediate compartment for confining the said motive power means therein, annular gear means secured internally of said drum and positioned in meshing relationship with the said intermediate gear, and ventilating openings in the periphery of the said drum communicating with the said intermediate compartment establishing an air circulating path thru the other of the said hollow stub shaft extensions to effectuate cooling of the said motive power means.

FRANK MILLER.

REFERENCES CITED

The following references are of record in the file of this patent:

UNITED STATES PATENTS

| Number | Name | Date |
| --- | --- | --- |
| 1,748,247 | Scribner | Feb. 25, 1930 |
| 1,812,651 | Gullberg | June 30, 1931 |
| 2,108,367 | Christian | Feb. 15, 1938 |
| 2,270,980 | Tidball | Jan. 27, 1942 |
| 2,173,339 | Myers | Sept. 19, 1939 |
| 2,184,669 | Hansen | Dec. 26, 1939 |